United States Patent Office 3,312,721
Patented Apr. 4, 1967

3,312,721
D-17β-(3-AMINOPROPOXY)-3-ALKOXYESTRA-1,3,5(10)-TRIENES AND UREA DERIVATIVES THEREOF
Gerhard R. Wendt, Havertown, and Kurt W. Ledig, Philadelphia, Pa., assignors to American Home Products Corporation, New York, N.Y., a corporation of Delaware
No Drawing. Filed Sept. 9, 1965, Ser. No. 486,227
4 Claims. (Cl. 260—397.5)

This invention is directed to novel d-17β-(3-aminopropoxy)-3-alkoxyestra-1,3,5(10)-trienes and to their urea derivatives.

Additionally, this invention is concerned with a process for making such compounds.

The claimed compounds, which have analgesic and anti-inflammatory activity as determined in standard warm blooded experimental animals can be represented by the following general formula:

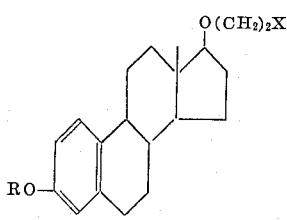

wherein X is CN, $CH_2NH_2$ or $CH_2NHCONHR'$ where R is a straight chain or branched lower alkyl radical having from 1 to 5 carbon atoms and R' is a lower alkyl radical having up to 6 carbons or cycloalkyl radicals or phenyl alkoxyphenyl, aralkyl, or halo phenyl. The compounds of type (III) form pharmaceutical acid addition salts with pharmaceutically acceptable organic and inorganic acids.

The claimed compounds are prepared by the reactions shown below:

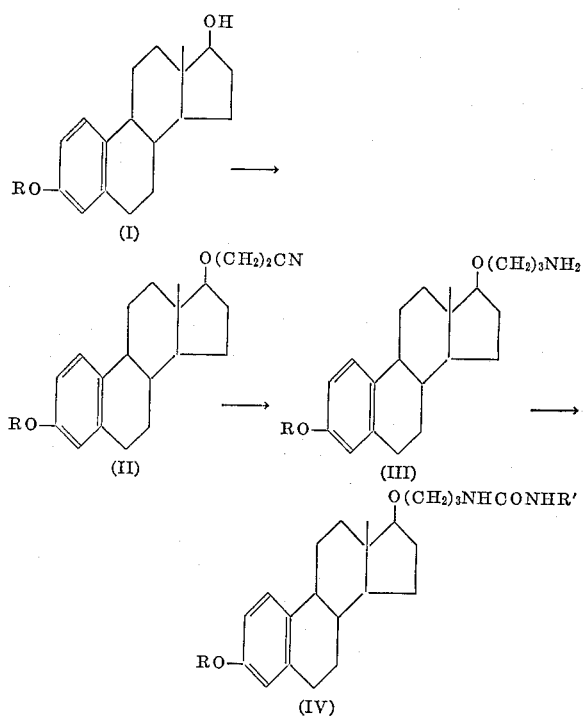

In the reactions shown above the corresponding commercially available starting compound, estradiol-3-alkyl ether (I) is condensed with acrylonitrile in the presence of a basic catalyst such as potassium tert. butoxide, sodium methoxide, potassium hydroxide, trimethylbenzylammonium hydroxide or basic Dowex-1-resin to form the corresponding cyanoethoxy compound (II). Reduction of this latter compound with lithium aluminum hydroxide provides the amino ether (III). This compound then is converted to its urea derivative (IV) with an alkyl, cycloalkyl or aryl isocyanate.

The claimed compounds can be administered in any dosage form suitable to achieve their pharmacological effect in mammals. When applied either alone or together with conventional pharmaceutical carriers, their effective dosages range from about 10 to 100 mg./kilo of body weight of the subject treated regardless of the route of administration selected for dosage. When oral administration is intended such tablets or capsule forms as employed may be made up with conventional binders or excipients such as spray dried or crystalline lactose, corn starch, methyl cellulose and the like. On the other hand, if it is desired to prepare solutions or suspensions for injection such conventional extenders as water, non-toxic alcohols and isotonic saline and the like may be employed.

The following specific examples are intended to illustrate but not limit the claimed invention.

EXAMPLE 1 d-17β-(2-cyanoethoxy)-3-methoxyestra-1,3,5(10)-triene

A suspension of 2.86 g. of estradiol-3-methyl ether, 20 ml. of benzene, 100 mg. of potassium tert. butoxide, and 1.06 g. acrylonitrile was refluxed for five hours. The precipitate was filtered and the filtrate evaporated to dryness and crystallized from methanol to yield 1.5 g. of the product. A sample was recrystallized from methanol to obtain the title compound; M.P. 102–103° C.

Elemental analysis confirmed the empirical formula for $C_{22}H_{29}NO_2$.

EXAMPLE 2 d-17β-(3-aminopropoxy)-3-methoxyestra-1,3,5(10)-triene, hydrochloride

To a suspension of 3.4 g. of d-17β-(2-cyanoethoxy)-3-methoxyestra-1,3,5(10)-triene and 50 ml. of ether was added a solution of 380 mg. of lithium aluminum hydride in 40 ml. of ether and the reaction mixture refluxed for five hours. After the addition of 1 ml. of water, the precipitate was filtered and the filtrate evaporated to obtain a gum. A solution of 1.0 g. of the gum in 20 ml. of anhydrous ether was made acidic with a 4.5 N solution of hydrochloric acid in isopropanol and the resulting precipitate filtered to give 700 mg. of the title compound; M.P. 158–165°.

Elemental analysis confirmed the empirical formula for $C_{22}H_{33}O_2N \cdot HCl$.

EXAMPLE 3 d-1-butyl-3-[3-(d-3-methoxyestra-1,3,5(10)-triene-17β-yloxy)propyl]urea

A solution of 1.4 g. of d-17β-(3-aminopropoxy-3-methoxyestra-1,3,5(10)-triene aid 50 ml. of benzene was refluxed with 0.5 ml. of butyl isocyanate for 4 hours. On addition of petroleum ether, the product precipitated to yield 1.0 g.; M.P. 144–145° C.

Elemental analysis confirmed the empirical formula for $C_{27}H_{42}N_2O_3$.

EXAMPLE 4

1-cyclohexyl-3-[3-(d-3-methoxyestra-1,3,5(10)-triene-17β-yloxy)propyl]urea

A mixture of 2.0 g. of d-17β-(3-aminopropoxy)-3-methoxyestra-1,3,5(10)-triene, 65 ml. of benzene and 0.71 g. of cyclohexylisocyanate was refluxed for 5 hours and let stand overnight at 25°. In the morning, 65 ml.

petroleum ether was added and the flask put in the cold room overnight. The resulting precipitate was recrystallized from acetone to yield the title compound; M.P. 177–178° C. I.R. 3.05, 6.16μ.

Elemental analysis confirmed the empirical formula for $C_{29}H_{44}O_3N_2$.

EXAMPLE 5

1-o-chlorophenyl-3-[3-(d-3-methoxyestra-1,3,5(10)-triene-17β-yloxy)propyl]urea To 2.0 g. of d-17β-(3-aminopropoxy)-3-methoxyestra-1,3,5(10)-triene in 65 ml. of benzene was added 0.71 ml. of o-chlorophenylisocyanate and the reaction mixture refluxed for 5.5 hours, then let stand at 25° over the weekend. After the addition of 65 ml. of petroleum ether, it was put in the cold room overnight. The precipitate was filtered, dried in vacuo to give the title compound; I.R. 3.05, 6.06μ; M.P. 171.5–175.5° C.

Elemental analysis confirmed the empirical formula for $C_{29}H_{37}N_2O_3Cl$.

When the procedure of the above examples is applied to the starting materials listed below, the final products hereinafter disclosed are obtained:

| Starting Materials | Products |
| --- | --- |
| d-Estradiol-3-ethyl ether | d-17β-(2-cyanoethoxy)-3-ethoxyestra-1,3,5(10)-triene; d-17β-(3-amino-propoxy)-3-ethoxyestra-1,3,5(10)-triene; d-1-pentyl-3-[3-(d-3-ethoxy-estra-1,3,5(10)-triene-17β-yloxy) propyl]urea. |
| d-Estradiol-3-propyl ether | d-17β-(2-cyanoethoxy)-3-propoxy-estra-1,3,5(10)-triene; d-17β-(3-aminopropoxy)-3-propoxyestra-1,3,5(10)-triene; d-1-p-bromobenzyl-3-[3-(d-3-propoxyestra-1,3,5(10)-triene-17β-yloxy)propyl]urea. |
| d-Estradiol-3-pentyl ether | d-17β-(2-cyanoethoxy)-3-pentoxyestra-1,3,5(10)-triene; d-1-p-ethoxyphenyl-3-[3-(d-3-pentoxyestra-1,3,5(10)-triene-17β-yloxy)propyl]urea. |

What is claimed is:
1. d-1-butyl-3-[3-(d-3-methoxyestra-1,3,5(10)-triene-17β-yloxy)propyl]urea.
2. 1-cyclohexyl-3-[3-(d-3-methoxyestra-1,3,5(10)-triene-17β-yloxy)propyl]urea.
3. 1-o-chlorophenyl-3-[3-(d-3-methoxyestra-1,3,5(10)-triene-17β-yloxy)propyl]urea.
4. A compound of the formula

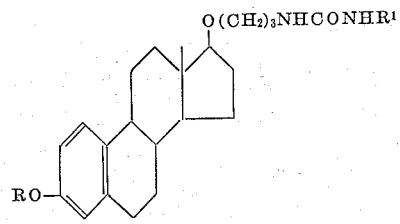

wherein R represents an alkyl group of 1 to 5 carbon atoms and $R^1$ is selected from the group consisting of lower alkyl, cycloalkyl, phenyl, aralkyl, lower alkoxy phenyl and halophenyl.

References Cited by the Examiner
UNITED STATES PATENTS 3,180,864   4/1965   Wendt et al. _____ 260—239.5

OTHER REFERENCES

Cross et al., Steroids, 5, pp. 557–583 (May 1965), pp. 562 and 563 relied on.   QP 801 S6S7.

ELBERT ROBERTS, *Primary Examiner.*

LEWIS GOTTS, *Examiner.*

THOMAS M. MESHBESHER, *Assistant Examiner.*